United States Patent
Grosjean et al.

(10) Patent No.: US 7,532,016 B2
(45) Date of Patent: May 12, 2009

(54) ELECTRONIC INTERFACE CIRCUIT FOR A CAPACITIVE SENSOR FOR MEASURING A PHYSICAL PARAMETER, AND METHOD FOR ACTIVATING THE ELECTRONIC CIRCUIT

(75) Inventors: Sylvain Grosjean, Les Fins (FR); Michel Willemin, Prêles (CH)

(73) Assignee: EM Microelectronic-Marin S.A., Marin (CH)

( * ) Notice: Subject to any disclaimer, the term of this patent is extended or adjusted under 35 U.S.C. 154(b) by 216 days.

(21) Appl. No.: 11/686,552

(22) Filed: Mar. 15, 2007

(65) Prior Publication Data

US 2007/0216423 A1    Sep. 20, 2007

(30) Foreign Application Priority Data

Mar. 15, 2006    (EP) .................................. 06111196

(51) Int. Cl.
    *G01R 27/26* (2006.01)
(52) U.S. Cl. ..................................... 324/661
(58) Field of Classification Search .................. 324/661
    See application file for complete search history.

(56) References Cited

U.S. PATENT DOCUMENTS 5,325,065 A * 6/1994 Bennett et al. .............. 324/661
5,661,240 A * 8/1997 Kemp ...................... 73/514.32
5,977,803 A   11/1999 Tsugai

FOREIGN PATENT DOCUMENTS

FR            2720510        12/1995

OTHER PUBLICATIONS

European Search Report issued in corresponding application No. EP 06 11 1196, completed May 16, 2006.
Leuthold, H. et al., "An ASIC for High-resolution Capactivie Microaccelerometers," Sensors and Actuators, A21-A23, 1990, pp. 278,281.

* cited by examiner

*Primary Examiner*—Amy He
(74) *Attorney, Agent, or Firm*—Griffin & Szipl, P.C.

(57) ABSTRACT

An electronic interface circuit of a capacitive sensor usable for measuring a physical parameter, wherein the sensor includes two differential mounted capacitors whose common electrode moves relative to each fixed electrode in order to alter capacitive value of each capacitor. The electronic circuit includes a charge transfer amplifier unit connected to the common electrode, a first integrator unit for integrating charges supplied by the charge transfer amplifier, a first excitation unit arranged between the output of the first integrator unit and the sensor for polarizing each fixed electrode of the capacitors to a determined voltage value, a second integrator unit for integrating the charges supplied by the charge transfer amplifier, and a second excitation unit arranged between the output of the second integrator unit and the sensor for polarizing each fixed electrode of the capacitors at an opposite voltage value to the voltage value controlled by the first excitation unit.

10 Claims, 4 Drawing Sheets

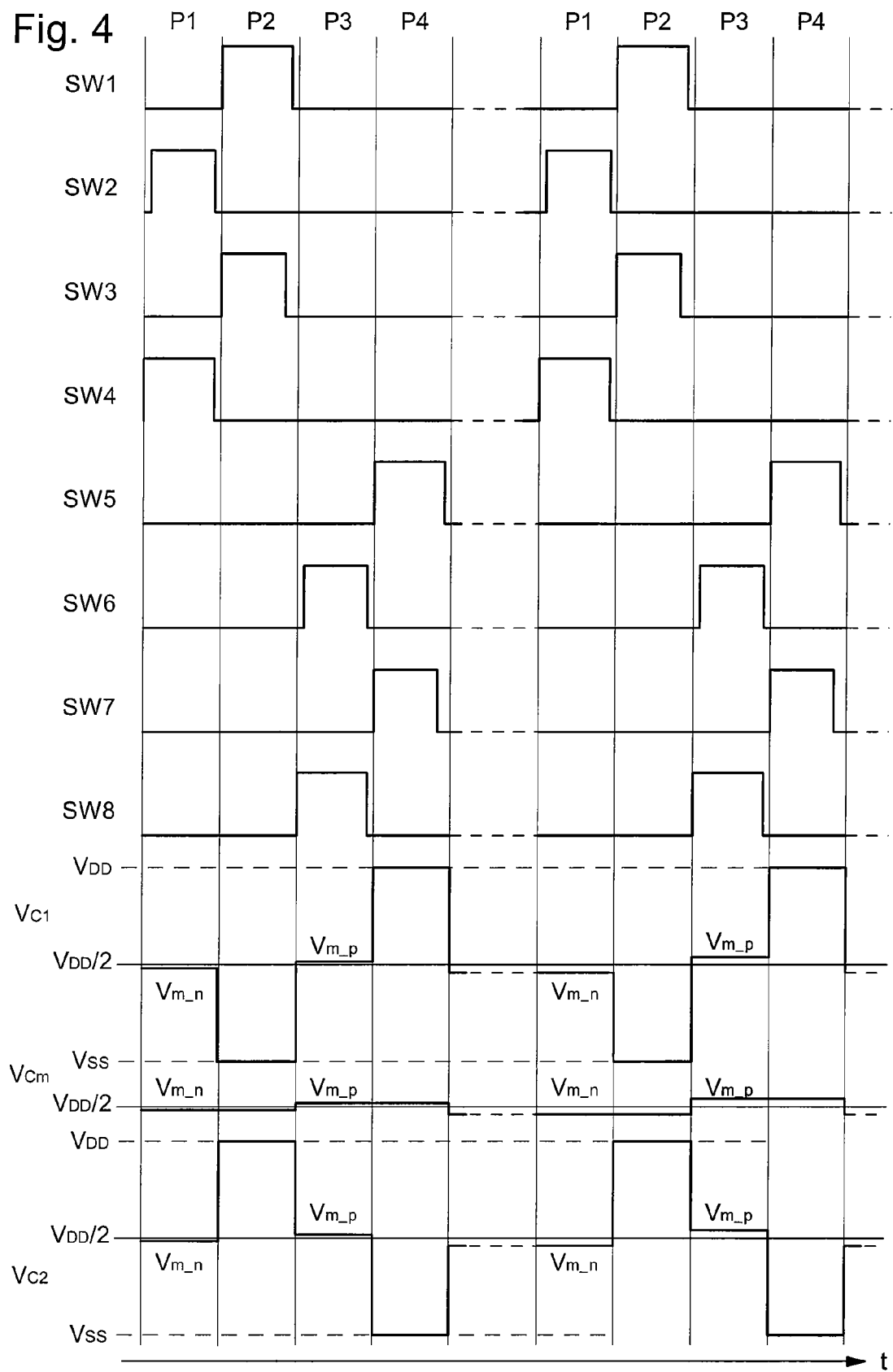

ELECTRONIC INTERFACE CIRCUIT FOR A CAPACITIVE SENSOR FOR MEASURING A PHYSICAL PARAMETER, AND METHOD FOR ACTIVATING THE ELECTRONIC CIRCUIT

This application claims priority from European Patent Application No. 06111196.9 filed Mar. 15, 2006, the entire disclosure of which is incorporated herein by reference.

FIELD OF THE INVENTION

The invention concerns an electronic interface circuit for a capacitive sensor for measuring a physical parameter, such as an acceleration, an angular speed, a force or pressure. The capacitive sensor is composed of two capacitors mounted in differential, one common electrode of which is capable of moving between two fixed electrodes via the action for example of a force in order to alter the capacitive value of each capacitor.

The invention also concerns a method for activating the electronic circuit.

BACKGROUND OF THE INVENTION

Usually, in such capacitive sensors for measuring a physical parameter, the mobile common electrode forms part of an armature resiliently held between the two fixed electrodes. This common electrode is capable of moving a certain distance in the direction of one or the other of the fixed electrodes via the action of a force for example. In the inoperative state, the common electrode is at an approximately equal distance from the two fixed electrodes, which defines equal capacitive values for the two capacitors. When the common electrode moves via the action for example of a force, the capacitive value of each capacitor varies inversely. The electronic interface circuit of a capacitive sensor is thus for providing an output signal in the form of a voltage dependent on the variation in the capacitances of the two capacitors.

In an ideal case, the output voltage varies in a linear manner in relation to the movement of the mobile common electrode. However, as the electronic circuit is made in the form of an integrated circuit in a semiconductor substrate, stray capacitances, which are added to the capacitances of the capacitors, must be taken into account. These stray capacitances are practically independent of the movement of the common electrode, which creates non-linearities. Consequently, the output voltage of the electronic circuit does not vary linearly in relation to the movement of the moving common electrode. These stray capacitances also have the effect of lowering the sensitivity or yield of the electronic circuit.

As the MEMS type sensor is also integrated in a semiconductor substrate, such as a silicon substrate, there is also a problem of non-linearity linked to the potential of the substrate during operation of the sensor. This substrate potential is difficult to control over the entire structure of the sensor, since the substrate is never totally conductive. Because of this non-linearity, the measured electrostatic force is not zero in the sensor and electronic circuit off mode. Because of the influence of the substrate potential on the electrostatic force, this leads to a variation in the measured real force, which is applied across the moving common electrode, which is a drawback.

In order generally to take a force, acceleration or pressure measurement, the fixed electrodes of the two capacitors are biased or excited cyclically by voltages of opposite polarity relative to an inoperative reference voltage. By biasing or polarizing the two fixed electrodes at different voltage levels, the charge difference across the moving electrode can be measured and converted into an electronic circuit output voltage. When the output voltage is stabilised at its final value, the total charge across the moving electrode becomes zero. This output voltage can be supplied sampled to a processing circuit able to provide acceleration, force, pressure or angular velocity data depending upon the structure of the sensor.

An electronic interface circuit of a capacitive sensor of the prior art is shown in FIG. 1, and the activation thereof is illustrated by a temporal diagram of various voltage signals in FIG. 2. The electronic circuit shown is based on an electronic circuit described in the article by Messrs H. Leutold and F. Rudolph, which appeared in the review entitled "Sensors and actuators" A21-A23 (1990), pages 278 to 281, and also by FR Patent No. 2 720 510.

The electronic circuit 1 shown is an interface of a capacitive sensor 2, which includes two differential mounted capacitors having a common electrode Cm able to move between two fixed electrodes to define two capacitors C1 and C2. Electronic circuit 1 includes a charge transfer amplifier unit 4, which is linked at input to the common electrode Cm, an integrator unit 5 to supply permanently at output a voltage Vm equal to the integral of charges provided by the amplifier unit 4, and an excitation unit 3 for cyclically biasing or polarizing the fixed electrodes at determined voltage levels.

Excitation unit 3 comprises four switches 12, 13, 14 and 15, which can be formed by MOS switching transistors in the integrated circuit. The first switch 12 is arranged between the output of integrator 5 and the fixed electrode of capacitor C1. The second switch 13 is arranged between the integrator output and the fixed electrode of capacitor C2. The third switch 14 is arranged between the high voltage terminal $V_{DD}$ of a voltage source and the fixed electrode of capacitor C1. Finally, the fourth switch 15 is arranged between the low voltage terminal $V_{SS}$ of the voltage source and the fixed electrode of capacitor C2.

In the electronic circuit operating mode, each cycle or successive measurement period is divided into two phases P1 and P2 as shown in FIG. 2. The passage from one phase to the other is controlled by clock signals that are not shown for respectively opening or closing the switches. Switches 12 and 13 are closed by signals SW2 at the "1" state in the first phase designated P1 in FIGS. 1 and 2, whereas switches 14 and 15 are open in this first phase P1. In this first phase P1, voltage Vm present at the integrator output is applied to each electrode of the sensor so as to completely discharge the two capacitors as shown by voltage diagrams $V_{C1}$, $V_{Cm}$ and $V_{C2}$.

Switches 14 and 15 are closed by signals SW1 at the "1" state in the second phase designated P2, whereas switches 12 and 13 are open. In this second phase P2, voltage $V_{DD}$ is applied to the fixed electrode C1 seen in the $V_{C1}$ diagram, whereas voltage $V_{SS}$ is applied to fixed electrode C2 seen in the $V_{C2}$ diagram. If the moving electrode is moved a certain distance in the direction of one or other of the fixed electrodes, the capacitances of the capacitors will vary inversely. This will lead to a difference in the charge accumulated by each capacitor, which also depends upon the voltage Vm applied previously to each electrode of the capacitors.

The final value of voltage Vm at the integrator output is obtained after several operating cycles of the electronic circuit as a function of the movement of the moving electrode between the two fixed electrodes as shown in the voltage $V_{Cm}$ diagram. In this case, the common electrode is moved in the direction of the fixed electrode of capacitor C1, which results in a final integrator output voltage, which is above the medium voltage $V_{DD}/2$. The potential of the common electrode has thus been adjusted so as to cancel out any charge flow and thus keep the total charge at zero in accordance with the principle of charge compensation.

For the operation of transferring charges accumulated by the common electrode Cm, the charge transfer amplifier unit 4 includes an operational amplifier 10, three capacitors C3, C4 and C5 and two switches 16 and 17. The inverter input of this amplifier is connected to common electrode Cm. Capacitor C3 in parallel with switch 16 is connected between the inverter input and the output of amplifier 10. Capacitor C4 is connected between the output of amplifier 10 and the input of integrator unit 5. Capacitor C5 is connected between the non-inverter input and a voltage reference terminal Vref, which can be defined as a mass DC equal to $V_{SS}$ or $V_{DD}/2$ or to another potential. Finally, switch 17 is arranged between the output of integrator unit 5 and the non-inverter input of amplifier 10.

In the electronic circuit operating mode, the two switches 16 and 17 are closed by signals SW2 at the "1" state in the first phase P1 to partly discharge capacitor C3 and to polarize capacitor C5 with the output voltage Vm at the non-inverter input of the amplifier. The voltage level Vm of capacitor C5 is maintained during the second phase P2.

Integrator unit 5, which follows charge transfer amplifier unit 4, includes two input switches 18 and 19, an operational amplifier 11 and an integration capacitor Cf. this capacitor Cf is connected between the inverter input and the output of amplifier 11, which provides the output voltage Vm of integrator 5. The input switch 18 is arranged between the output terminal of capacitor C4 of charge transfer unit 4 and the non-inverter input of amplifier 11. The potential of this non-inverter input of amplifier 11 is fixed to the voltage reference Vref. The switch 19 is arranged between the output terminal of capacitor C4 of charge transfer unit 4 and the inverter input of amplifier 11.

In the electronic circuit operating mode, switch 18 is closed by signals SW2 at the "1" state in the first phase P1 so that the voltage at the terminals of capacitor C4 of the charge transfer unit is equal to Vm if the reference voltage Vref is at earth. Switch 19 is closed by signals SW1 at the "1" state in the second phase P2 to control a charge flow between the output terminal of capacitor C4 of charge transfer unit 4 and integrator 5. This charge flow from charge transfer amplifier unit 4 is integrated in capacitor Cf. Thus, the output voltage Vm is altered by a quantity proportional to the charge accumulated across the common moving electrode during the second phase.

The operation of the electronic circuit described hereinbefore is of the asymmetrical type, since the fixed electrode of the capacitor C1 is always polarized at the same potential $V_{DD}$ in each second phase P2, whereas the fixed electrode of capacitor C2 is always biased at $V_{SS}$ in each second phase P2. This type of integrated electronic circuit thus encounters the same problems of non-linearity mentioned above in relation to stray capacitances and the substrate potential, which is a drawback. Moreover, since the electronic circuit is made in the form of an integrated circuit, any voltage offset linked to unmatched electronic components cannot be removed, which is another drawback.

The U.S. Pat. No. 5,977,803 describes an interface circuit of a capacitive sensor, which includes two capacitors mounted in differential. This interface circuit is more compact than the interface circuit described in reference to FIG. 1, since it uses for measurement of capacitive value difference converted in a measurement output voltage only an operational amplifier directly connected to the capacitive sensor. In each measurement cycle, the sensor capacitors are directly discharged by the output voltage value of the operational amplifier. Even if the polarity of the voltage which is applied to each fixed electrode of the capacitors, is modified at the end of several measurement cycles, the interface circuit does not allow solve the problems above-mentioned, which is a drawback.

SUMMARY OF THE INVENTION

It is thus a main object of the invention to provide an electronic circuit as an interface for a capacitive sensor for measuring a physical parameter that is capable of operating totally symmetrically in order to overcome the aforecited drawbacks.

The invention therefore concerns an electronic interface circuit for a capacitive sensor aforecited, wherein in accordance with a first embodiment of the present invention, an electronic interface circuit for a capacitive sensor for measuring a physical parameter, such as an acceleration, an angular velocity, force or pressure, is provided, wherein the sensor includes at least two differential mounted capacitors whose common electrode is able to move relative to each fixed electrode of the two capacitors in order to alter the capacitive value of each capacitor when the physical parameter is measured, wherein the electronic circuit includes: (a) a charge transfer amplifier unit connected to the common electrode, (b) a first integrator unit for integrating the charges supplied by the charge transfer amplifier unit, and (c) a first excitation unit arranged between the output of the first integrator unit and the sensor for polarizing each fixed electrode of the capacitors at a determined voltage value, or for discharging each capacitor by an output voltage of the first integrator unit, wherein the electronic circuit includes (d) a second integrator unit for integrating the charges supplied by the charge transfer amplifier, the first and second integrator units being arranged to operate alternately and cyclically each measurement period, and (e) a second excitation unit arranged between the output of the second integrator unit and the sensor for polarizing each fixed electrode of the capacitors at a determined voltage value opposite to the voltage value controlled by the first excitation unit, or for discharging each capacitor by an output voltage of the second integrator unit, wherein the first and second excitation units are arranged to operate alternately and cyclically each measurement period, each with its respective integrator unit so that the electronic circuit operates entirely symmetrically for the physical parameter measurement.

Specific embodiments of the electronic circuit are defined in second to fifth embodiments of the invention. More specifically, in accordance with a second embodiment of the invention, the first embodiment is modified so that the structure of the first integrator unit is equivalent to the structure of the second integrator unit. In accordance with a third embodiment of the invention, the second embodiment is further modified so that each integrator unit includes an operational amplifier, an integration capacitor connected between an inverter input of the amplifier and the amplifier output, a first switch connected between the output of the charge transfer amplifier unit and the inverter input of the amplifier, and a second switch connected between the output of the charge transfer amplifier unit and the non-inverter input of the amplifier, which is intended to be polarized at a reference voltage, in an electronic circuit operating mode, each switch of each operating integrator unit being controlled to be in a closed state for one of the switches when the other switch is in an open state in each measurement period. In accordance with a fourth embodiment of the present invention, the first embodiment is modified so that the structure of the first excitation unit is equivalent to the structure of the second excitation unit, wherein each excitation unit is connected to a high voltage terminal and a low voltage terminal of a continuous voltage source. In accordance with a fifth embodiment of the present invention, the fourth embodiment is further modified so that the first excitation unit includes four switches, wherein the first switch is connected between the output of the first integrator unit and the fixed electrode of the first capacitor, the second switch is connected between the output of the first integrator unit and the fixed electrode of the second capacitor, the third switch is connected between the high voltage terminal and the fixed electrode of the first capacitor, and the fourth switch is connected between the low voltage terminal and the fixed electrode of the second capacitor, and in one operating mode of the electronic circuit, the first and second switches are in a closed state when the third and fourth switches are in an open state and vice versa in each measurement period, and wherein the second excitation unit includes four switches, wherein the first switch is connected between the output of the second integrator unit and the fixed electrode of the first capacitor, the second switch is connected between the output of the second integrator unit and the fixed electrode of the second capacitor, the third switch is connected between the low voltage terminal and the fixed electrode of the first capacitor, and the fourth switch is connected between the high voltage terminal and the fixed electrode of the second capacitor, and in one operating mode of the electronic circuit, the first and second switches are in a closed state when the third and fourth switches are in an open state and vice versa each measurement period.

One advantage of the electronic circuit lies in the fact that the electronic circuit is formed of a double structure with two integrators and two excitation units, which operate alternately and totally symmetrically. Owing to this feature, compensation for a voltage offset due to technology or supply voltage variation can be minimised or removed using the two integrator output signals. During operation of the electronic circuit, each measuring cycle or period is thus divided into four phases, including two successive phases for each integrator. Moreover, the substrate potential is no longer of great importance, given that the electronic circuit is devised with an identical double structure operating totally symmetrically.

The electronic circuit advantageously provides two times more output signals each in the form of a voltage than any other state of the art electronic circuit. With the double structure of the electronic circuit, it is no longer necessary to guarantee a high level of precision as to then inoperative voltage at the common electrode. Moreover, averaging the two output signals provided by the integrators improves the signal-to-noise ratio of the electronic circuit.

The invention therefore also concerns a method for activating the electronic circuit for measuring a physical parameter, which includes the features defined in accordance with a sixth embodiment. In accordance with the sixth embodiment of the present invention, a method for activating the electronic circuit according to first embodiment is provided, wherein in an operating mode of the electronic circuit for measuring the physical parameter, the method includes four phases for each successive measurement cycle, consisting: (i) in a first phase of switching on the second integrator unit with the second excitation unit and switching off the first integrator unit with the first excitation unit, in order to polarize each fixed electrode of the capacitors at an output voltage of the second integrator unit, (ii) in a second phase in which the second integrator unit and the second excitation unit are operating, of polarizing the fixed electrode of the first capacitor at a low voltage of a supply voltage source of the electronic circuit, and the fixed electrode of the second capacitor at a high voltage of the voltage source, (iii) in a third phase of switching on the first integrator unit with the first excitation unit and switching off the second integrator unit with the second excitation unit, in order to polarize each fixed electrode of the capacitors at an output voltage of the first integrator unit, and (iv) in a fourth phase where the first integrator unit and the first excitation unit are operative, of polarizing the fixed electrode of the first capacitor at a high voltage, and the fixed electrode of the second capacitor at a low voltage.

Particular advantageous steps of the method are defined in the seventh to ninth embodiments of the invention. More specifically, in accordance with the seventh embodiment of the present invention, the sixth embodiment of the present invention is modified so that several successive measurement cycles are carried out so that each integrator unit provides a final output voltage, where one of the final output voltages is above an intermediate rest voltage of the sensor, whereas the other final output voltage is below the intermediate voltage, and the voltage deviation between each final output voltage and the intermediate voltage is representative of the measured physical parameter. In accordance with an eighth embodiment of the present invention, the sixth embodiment is modified so that in an operating checking mode of the electronic circuit before or during the measurement of a physical parameter, an electrostatic force is deliberately emulated by not polarizing one or other of the fixed electrodes of the capacitors at the high voltage, or the low voltage, during the second or fourth phase of a normal measurement cycle. In accordance with a ninth embodiment of the present invention, the eighth embodiment is further modified so that the fixed electrode of the second capacitor is not polarized at the low voltage during the fourth phase every two measurement cycles.

In sum then, the present invention pertains broadly to an electronic interface circuit (1) of a capacitive sensor (2) used for measuring a physical parameter, such as an acceleration and the like. The sensor includes two differential mounted capacitors (C1, C2) whose common electrode (Cm) can move relative to each other fixed electrode in order to alter the capacitive value of each capacitor. The electronic circuit includes a charge transfer amplifier unit (4) connected to the common electrode (Cm), a first integrator unit (5) for integrating the charges supplied by the charge transfer amplifier and a first excitation unit (3) arranged between the output of the first integrator unit and the sensor for polarizing each fixed electrode of the capacitors to a determined voltage value. The electronic circuit also includes a second integrator unit (7) for integrating the charges supplied by the charge transfer amplifier and a second excitation unit (6) arranged between the output of the second integrator unit and the sensor for polarizing each fixed electrode of the capacitors at an opposite voltage value to the voltage value controlled by the first excitation unit. The first and second integrator units are arranged to operate alternately by measuring period or cycle, and the first and second excitation units are arranged to operate alternately by measuring period or cycle each with their respective integrator unit. Thus, the electronic circuit operates entirely symmetrically for measuring the physical parameter.

BRIEF DESCRIPTION OF THE DRAWINGS

The objects, advantages and features of the electronic interface circuit for a capacitive sensor for measuring a physical parameter, and the method for activating the electronic circuit will appear more clearly in the following description with reference to the drawings, in which:

FIG. 4 shows a temporal diagram of various voltage signals during several measuring cycles each divided into four phases of the method for activating the electronic circuit of FIG. 3 according to the invention.

DETAILED DESCRIPTION OF THE INVENTION

In the following description, since various components of the electronic interface circuit for a sensor with differential capacitors are well known, they will not be explained in detail.

Figure 3:
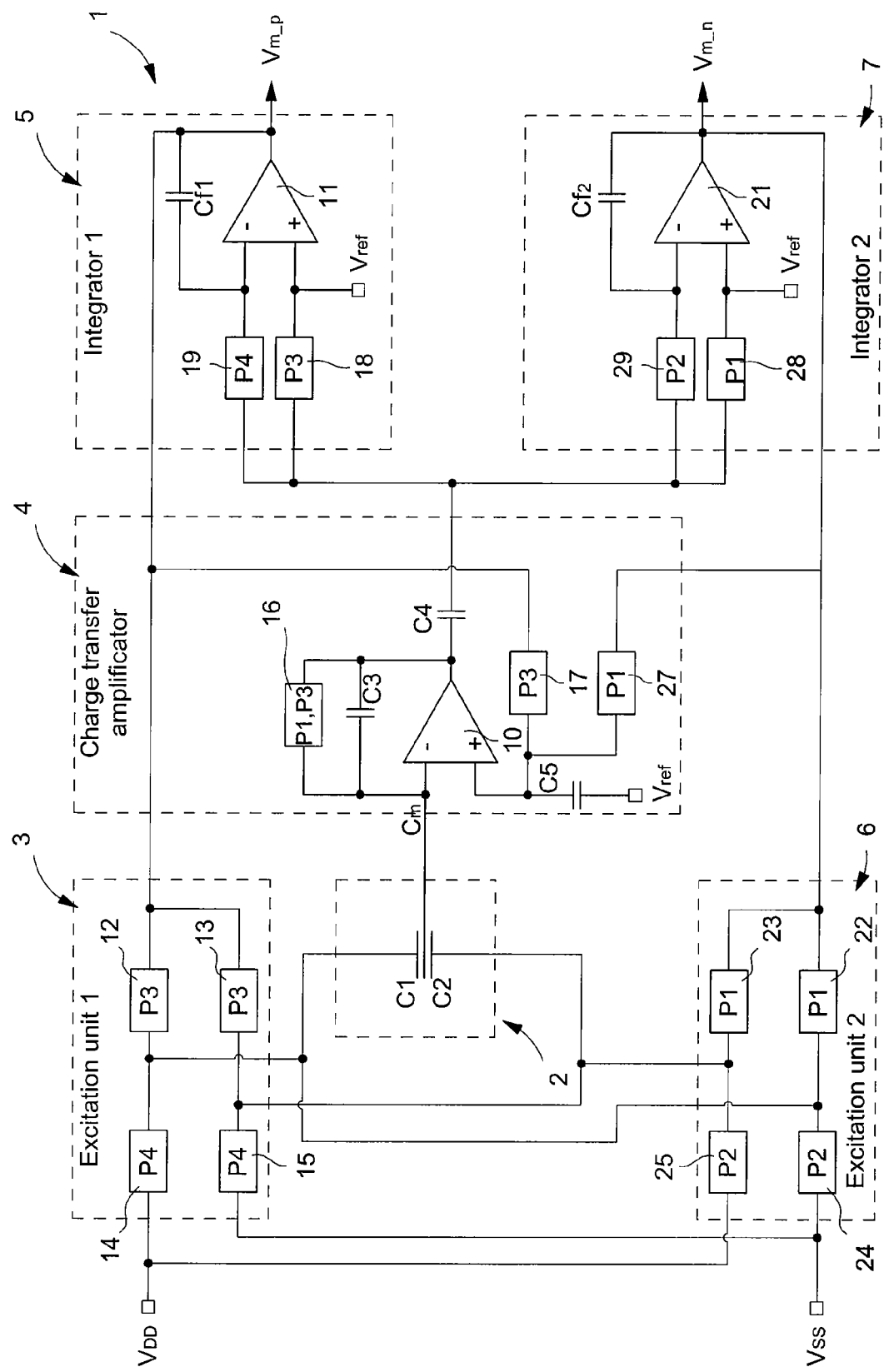
FIG. 3 shows in a simplified manner an electronic interface circuit for a capacitive sensor according to the invention.

FIG. 3 shows a simplified diagram of the various components of the electronic interface circuit 1 for a capacitive sensor 2 according to the invention. This sensor generally comprises two differential mounted capacitors. A common electrode Cm of the capacitors is able to move via the action particularly of a force between two fixed electrodes to define two variable capacitances C1 and C2. This enables the electronic circuit to provide measuring signals for a physical parameter, such as an acceleration, an angular velocity, pressure or force for example as a function of the movement of the moving common electrode.

The moving electrode Cm forms part of an armature of the sensor resiliently held in an inoperative central position between the two fixed electrodes. Electronic circuit 1 can be powered by a continuous voltage source that is not shown, supplying a high voltage $V_{DD}$ to a first terminal and a low voltage $V_{SS}$ to a second terminal. The low voltage can be defined as 0 V. The fixed electrode of each capacitor can be biased or polarized either at the high voltage $V_{DD}$, or at the low voltage $V_{SS}$ in an operating mode of the electronic circuit. Consequently, since the two capacitors have an equal capacitive value in an inoperative mode of sensor 2, the voltage across the common electrode Cm is equal in the inoperative state to an intermediate voltage $V_{DD}/2$ between high voltage $V_{DD}$ and low voltage $V_{SS}$.

Figure 1:
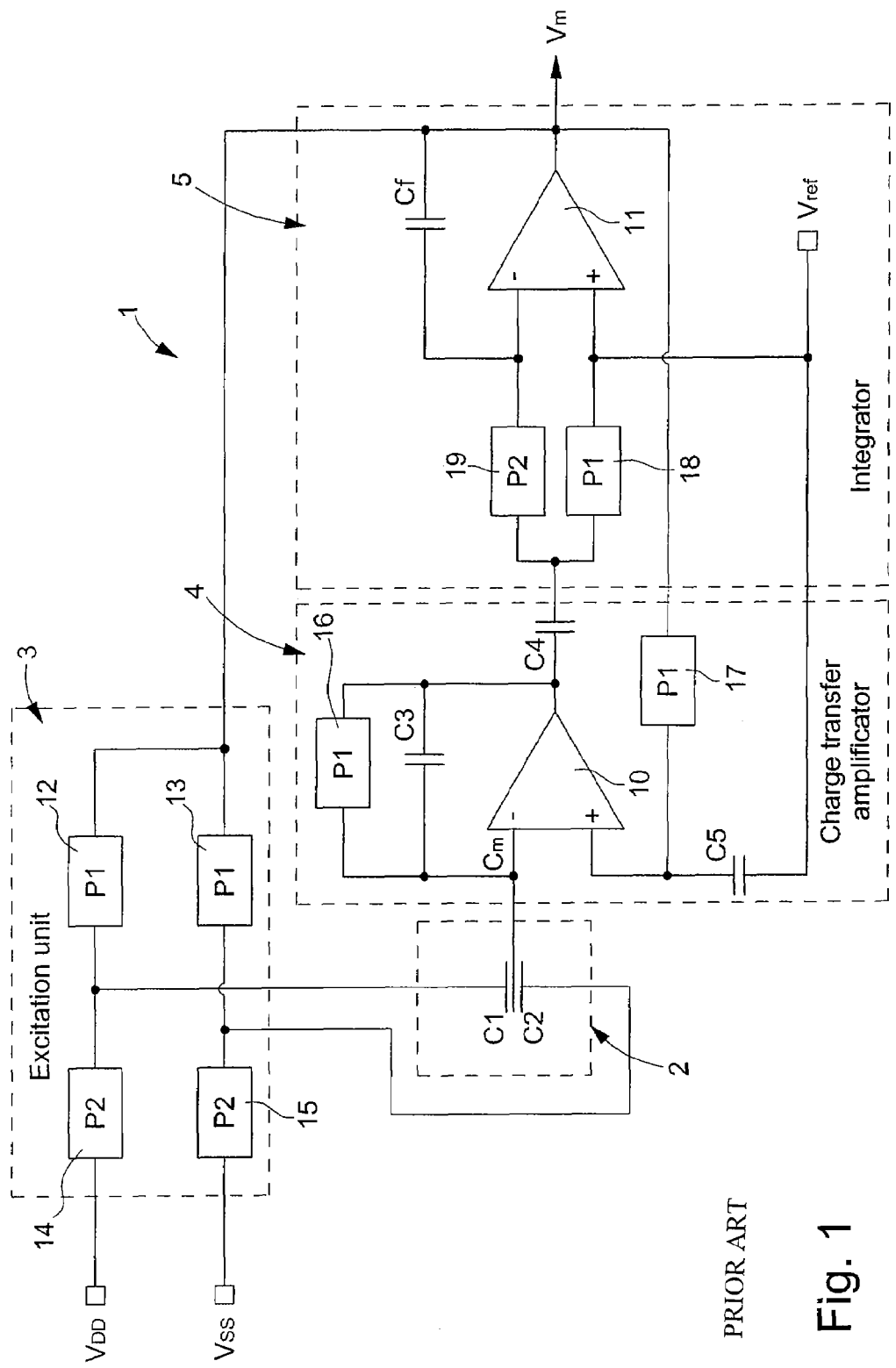
FIG. 1, already cited, shows in a simplified manner an electronic interface circuit for a capacitive sensor of the prior art.
Figure 2:
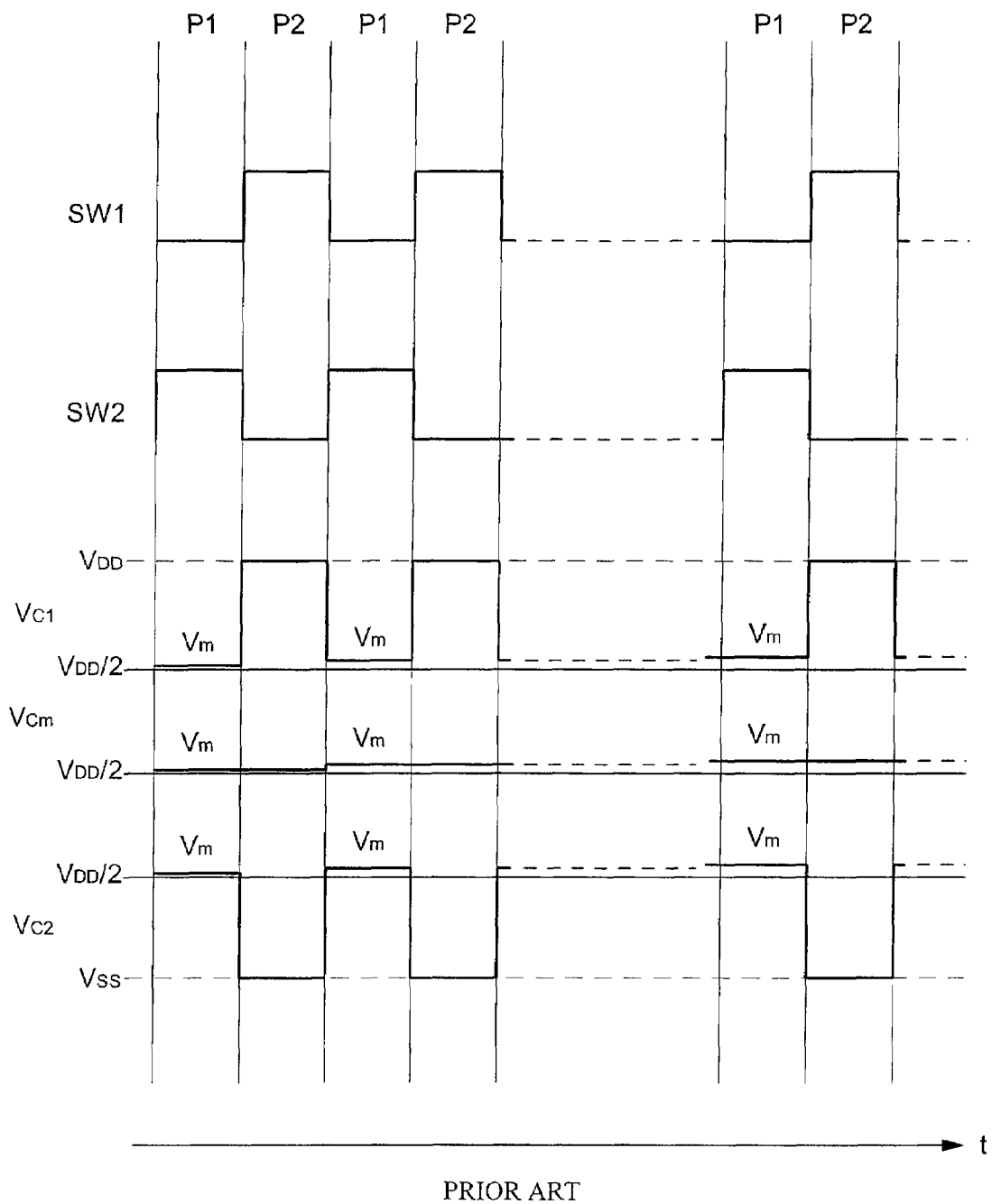
FIG. 2, already cited, shows a temporal diagram of various voltage signals during several measuring cycles each divided into two phases of the method for activating the electronic circuit of FIG. 1 according to the prior art.

As for the embodiment of the prior art shown in FIG. 1, electronic circuit 1 includes a charge transfer amplifier unit 4, which is connected at input to the common electrode Cm, a first integrator unit 5 and a second integrator unit 7 of identical structure, connected to the output of amplifier unit 4, a first excitation unit 3 arranged between the output of the first integrator unit 5 and sensor 2, and a second excitation unit 6 arranged between the output of the second integrator unit 7 and sensor 2. The first integrator unit 5 permanently supplies an output voltage Vm_p, equal to the integral of the charges provided by amplifier unit 4, whereas the second integrator unit 7 permanently provides at output a voltage Vm_n inverse to voltage Vm_p relative to an intermediate rest voltage $V_{DD}/2$. Each excitation unit 3 and 6 alternately and cyclically polarizes the fixed electrodes at specified voltage levels, as described hereinafter.

The first excitation unit 3 comprises four switches 12, 13, 14 and 15, which can be formed by MOS switching transistors in the integrated circuit. As for the electronic circuit of FIG. 1, the first switch 12 is arranged between the output of the first integrator unit 5 and the fixed electrode of capacitor C1. The second switch 13 is arranged between the output of the first integrator unit and the fixed electrode of capacitor C2. The third switch 14 is arranged between the high voltage terminal $V_{DD}$ of a voltage source and the fixed electrode of capacitor C1. Finally, the fourth switch 15 is arranged between the low voltage terminal $V_{SS}$ of the voltage source and the fixed electrode of capacitor C2.

The second excitation unit 6 is of a similar structure like the first excitation unit 3. This second excitation unit 6 includes also four switches 22, 23, 24 and 25, which can be formed by MOS transistors in the integrated circuit. This first switch 22 is arranged between the output of the second integrator unit 7 and the fixed electrode of capacitor C1. The second switch 23 is arranged between the output of the second integrator unit 7 and the fixed electrode of capacitor C2. The third switch 24 is arranged between the low voltage terminal $V_{SS}$ and the fixed electrode of capacitor C1. Finally, the fourth switch 25 is arranged between the high voltage terminal $V_{DD}$ and the fixed electrode of capacitor C2.

For the method activating the electronic circuit in operating mode, each successive operating cycle or period is divided into four phases P1 to P4, as shown in FIG. 4. Passage from one phase to another is controlled by clock signals that are not shown, to respectively open or close the switches of the first and second excitation units 3 and 6. In the first two phases P1 and P2, the second integrator unit 7, and the second excitation unit 6 are operational, whereas in the third and fourth phases P3 and P4, the first integrator unit 5, and the first excitation unit 3 are operational. Consequently, at each half-period, the first integrator unit 5 and excitation unit 3, and the second integrator unit 7 and excitation unit 6 are alternately switched on symmetrically.

First of all, switches 22 and 23 are closed by signals SW2 at the "1" state in the first phase designated P1 in FIGS. 3 and 4, whereas switches 24, 25, 12 to 15 are open in this first phase P1. In this first phase P1, the voltage Vm_n present at the output of second integrator unit 7 is applied to each electrode of sensor 2. This completely discharges the two capacitors as shown by the diagrams of voltages $V_{C1}$, $V_{Cm}$ and $V_{C2}$.

Switches 24 and 25 are then closed by signals SW1 at the "1" state in the second phase designated P2, whereas switches 22, 23, 12 to 15 are open. In this second phase P2, voltage $V_{SS}$ is applied to the fixed electrode C1 seen in the diagram of $V_{C1}$, whereas voltage $V_{DD}$ is applied to the fixed electrode C2 seen in the diagram of $V_{C2}$. If the moving electrode is moved a certain distance in the direction of one or other of the fixed electrodes, the capacitances of the capacitors will vary inversely.

As shown in FIG. 4, moving electrode Cm has moved towards the fixed electrode of capacitor C1. This makes capacitance C1 larger than capacitance C2. This will lead to a difference in the charges accumulated by each capacitor, which also depends upon the voltage Vm_n previously applied to each electrode of the capacitors. The output voltage Vm_n of the second integrator unit 7 tends towards a final voltage Vm_n which is in this case below the intermediate voltage $V_{DD}/2$ after several measurement cycles.

In the third phase designated P3, switches 12 and 13 of the first excitation unit 3 are closed by signals SW6 at the "1" state, whereas switches 14, 15, 22 to 25 are open in this third phase P3. In third phase P3, the voltage Vm_p present at the output of the first integrator unit 5 is applied to each electrode of sensor 2. This completely discharges the two capacitors to voltage Vm_p as shown by the voltage diagrams $V_{C1}$, $V_{Cm}$ and $V_{C2}$.

Switches 14 and 15 are then closed by signals SW5 at the "1" state in the fourth phase designated P4, whereas switches 12, 13, 22 to 25 are open. In this fourth phase P4, voltage $V_{DD}$ is applied to the fixed electrode C1 seen in the $V_{C1}$ diagram, whereas voltage $V_{SS}$ is applied to the fixed electrode C2 seen in the $V_{C2}$ diagram. As one can be observed in these diagrams, by alternately polarizing each fixed electrode C1 or C2 in each operating period once at $V_{DD}$ and once at $V_{SS}$, the operation of the electronic circuit is thereby totally symmetrical.

The final value of voltage Vm_p at the output of the first integrator unit 5 and the final value of voltage Vm_n at the output of the second integrator unit 7 are obtained after several operating cycles of the electronic circuit. Initially, voltages Vm_p and Vm_n are equal to intermediate voltage $V_{DD}/2$. These voltage values are a function of the movement of the moving electrode between the two fixed electrodes as shown in the diagram of voltage $V_{Cm}$. In this case, the common electrode is moved in the direction of the fixed electrode of capacitor C1. This leads to a final output voltage Vm_p of first integrator unit 5 above the medium voltage $V_{DD}/2$, and a final output voltage Vm_n of the second integrator unit 7 below $V_{DD}/2$ as indicated by the following formulae:

$$Vm\_p = V_{DD}/2 + ((C1-C2)/(C1+C2)) \cdot V_{DD}/2$$

$$Vm\_n = V_{DD}/2 - ((C1-C2)/(C1+C2)) \cdot V_{DD}/2$$

After several measurement cycles, for example 50 cycles, the final voltage deviation between Vm_p and $V_{DD}/2$ and the final voltage deviation between Vm_n and $V_{DD}/2$ are equal. This allows two measuring signals to be processed in a processing circuit that is not shown in order to compensate for the aforementioned non-linearities.

For the transfer operation of the charges accumulated by the common electrode Cm, the charge transfer amplifier unit 4 includes an operational amplifier 10, three capacitors C3, C4 and C5 and three switches 16, 17 and 27 as shown in FIG. 3. The inverter input of this amplifier is connected to common electrode Cm. Capacitor C3 in parallel with switch 16 is connected between the inverter input and the output of amplifier 10. Capacitor C4 is connected between the output of amplifier 10 and the input of the two integrator units 5 and 7. Capacitor C5 is connected between the non-inverter input and a reference voltage terminal Vref which can be defined as a mass DC equal to $V_{SS}$ or $V_{DD}/2$ or to another potential. A switch 17 is arranged between the output of the first integrator unit 5 and the non-inverter input of amplifier 10. Finally, a switch 27 is arranged between the output of the second integrator unit 7 and the non-inverter input of the amplifier.

In the electronic circuit operating mode described in accordance with FIGS. 3 and 4, the two switches 16 and 27 are closed by signals SW2 at the "1" state in the first phase P1. This, on one hand, discharges capacitor C3 and polarizes capacitor C5 with output voltage Vm_n of the second integrator unit 7 at the non-inverter input of the amplifier. The voltage level Vm_n of capacitor C5 is maintained during the second phase P2 where switches 16 and 27 are open. Switch 17 remains open in phases P1 and P2.

In the third phase P3, the two switches 16 and 17 are closed by signals SW6 at the "1" state. This, on one hand, discharges capacitor C3 again and polarizes capacitor C5, this time with the output voltage Vm_p of the first integrator unit 5. The voltage level Vm_p of capacitor C5 is maintained during fourth phase P4 when switches 16 and 17 are open. Switch 27 remains open in phases P3 and P4.

The first integrator unit 5, which follows the charge transfer amplifier unit 4, comprises two input switches 18 and 19, an operational amplifier 11 and an integration capacitor Cf1. This capacitor Cf1 is connected between the inverter input and the output of amplifier 11, which supplies the output voltage Vm_p of first integrator unit 5. The input switch 18 is arranged between the output terminal of capacitor C4 of charge transfer unit 4 and the non-inverter input of amplifier 11. The potential of this non-inverter input of amplifier 11 is fixed at voltage reference Vref. Switch 19 is arranged between the output terminal of capacitor C4 of charge transfer unit 4 and the inverter input of amplifier 11.

The second integrator unit 7, which follows amplifier unit 4, comprises two input switches 28 and 29, an operational amplifier 21 and an integration capacitor Cf2. This capacitor Cf2 is connected between the inverter input and the output of amplifier 21, which supplies the output voltage Vm_n of the second integrator unit 7. The input switch 28 is arranged between the output terminal of capacitor C4 of charge transfer unit 4 and the non-inverter input of amplifier 21. The potential of this non-inverter input of amplifier 21 is fixed at voltage reference Vref. Switch 29 is arranged between the output terminal of capacitor C4 of charge transfer unit 4 and the inverter input of amplifier 21.

In the electronic circuit operating mode, switch 28 is closed by signals SW4 at the "1" state in the first phase P1, whereas switch 29 is open. The voltage at the terminals of capacitor C4 of the charge transfer unit is thus equal to Vm_n if the reference voltage Vref is at earth. Switch 29 is closed by signals SW3 at the "1" state in the second phase P2, whereas switch 28 is open. This allows a flow of charges between the output terminal of capacitor C4 of charge transfer unit 4 and the second integrator unit 7. This charge flow from the charge transfer amplifier unit 4 is integrated in capacitor Cf2. Thus, output voltage Vm_n is altered by a quantity proportional to the charge accumulated across the common moving electrode during the second phase.

It should be noted that the length of signals SW1 at the "1" state is slightly greater than signals SW3. The same is true of signals SW4 relative to signals SW2 so that certain switches are closed or opened before other switches in each phase P1 and P2.

For the third and fourth phases P3 and P4 of each operating cycle, the first integrator unit 5 is used, whereas the second integrator unit is left inoperative. Switch 18 is thus closed by signals SW8 at the "1" state in the third phase P3, whereas switch 19 is open. The voltage at the terminals of capacitor C4 is thus equal to Vm_p. Switch 19 is closed by signals SW7 at the "1" state in fourth phase P4, whereas switch 18 is open. This allows a charge flow between the output terminal of capacitor C4 and first integrator unit 5. This charge flow from amplifier unit 4 is integrated in capacitor Cf1. Thus, the output voltage Vm_p is altered by a quantity proportional to the charged accumulated across the common moving electrode during the fourth phase.

It should be noted that the length of signals SW5 at the "1" state is slightly greater than signals SW7. The same is true of signals SW8 relative to signals SW6 so that certain switches are closed or opened before other switches in each phase P3 and P4.

As mentioned previously at the end of the measurement cycles, the voltage deviations between the output voltage Vm_p and Vm_n of first and second integrator units 5 and 7, and intermediate voltage $V_{DD}/2$ are substantially equal. The processing circuit connected to the electronic interface circuit of the sensor is thus able to process twice as many signals as in the prior art. Moreover, by combining or subtracting each output voltage signal, any voltage deviation linked to technology or to a supply voltage variation can be compensated for. Moreover, the non-linearities due to the substrate potential and stray capacitances are also attenuated by the structure of the electronic circuit and its totally symmetrical operation.

In order to give a non-limiting order of magnitude as to the scope of the invention, capacitance C1 or C2 of each capacitor is of the order of 450 fF in the inoperative state. The capacitance of capacitor C3 can be of the order of 600 fF. The capacitance of capacitor C4 can be of the order of 1 pF. The capacitance of capacitor C5 can be of the order of 1.8 pF. Finally, the capacitance of capacitors Cf1 and Cf2 can be of the order of 5 pF. Each phase of each cycle is approximately of the order of 6 μs, which gives a final measuring voltage after approximately 1 ms. Moreover, the sensor can be configured such that electronic circuit 1 provides a voltage deviation between output voltage Vm_p and intermediate voltage $V_{DD}/2$ of 20 mV for 1 g of acceleration for example.

In order to perform a check (not illustrated) of the correct functioning of the electronic circuit, one could envisage deliberately generating an electrostatic force prior to taking a physical parameter measurement. Thus the arrangement of the phases of certain cycles could be altered to emulate an acceleration independently of any movement of the moving electrode of the sensor. In order to do this, one could envisage not polarizing the fixed electrode C2 at low voltage $V_{SS}$ in phase P4 once every two cycles in order to keep it at voltage Vm_p for example. This voltage Vm_p may be equal to $V_{DD}/2$ since this check is carried out prior to measuring the physical parameter or at the start of any measurement. By deliberately removing the symmetry between the voltage polarization signals applied across the capacitors, the correct functioning of the electronic circuit can thus be measured.

From the description that has been given, multiple variants of the electronic interface circuit for the capacitive sensor can be devised by those skilled in the art without departing from the scope of the invention defined by the claims. One could envisage altering the length of each phase in relation to the other or altering the length of each cycle during the physical parameter measurement operations. One or several integrator units could be placed in parallel with the first and/or second integrator units, and one or several excitation units could be placed in parallel with the first and/or second excitation units for the purpose of safety.

What is claimed is:

1. An electronic interface circuit for a capacitive sensor for measuring a physical parameter, the sensor including at least two differential mounted capacitors whose a common electrode is able to move relative to each fixed electrode of the two capacitors in order to alter the capacitive value of each capacitor when the physical parameter is measured, said electronic circuit including:
   (a) a charge transfer amplifier unit connected to the common electrode;
   (b) a first integrator unit for integrating the charges supplied by the charge transfer amplifier unit; and
   (c) a first excitation unit arranged between the output of the first integrator unit and the sensor for polarizing each fixed electrode of the capacitors at a determined voltage value, or for discharging each capacitor by an output voltage of the first integrator unit;
   (d) a second integrator unit for integrating the charges supplied by the charge transfer amplifier, wherein the first and second integrator units are arranged to operate alternately and cyclically each measurement period; and
   (e) a second excitation unit arranged between the output of the second integrator unit and the sensor for polarizing each fixed electrode of the capacitors at a determined voltage value opposite to the voltage value controlled by the first excitation unit, or for discharging each capacitor by an output voltage of the second integrator unit, wherein the first and second excitation units are arranged to operate alternately and cyclically each measurement period, wherein the first excitation unit operates with the first integrator unit and the second excitation unit operates with the second integrator unit so that the electronic circuit operates entirely symmetrically for the physical parameter measurement.

2. The electronic circuit according to claim 1, wherein the structure of the first integrator unit is equivalent to the structure of the second integrator unit.

3. The electronic circuit according to claim 2, wherein each integrator unit includes
   i. an operational amplifier;
   ii. an integration capacitor connected between an inverter input of the amplifier and the amplifier output;
   iii. a first switch connected between the output of the charge transfer amplifier unit and the inverter input of the amplifier; and
   iv. a second switch connected between the output of the charge transfer amplifier unit and the non-inverter input of the amplifier, wherein the non-inverter input of the amplifier is intended to be polarized at a reference voltage, and in an electronic circuit operating mode, one switch of each operating integrator unit is controlled to be in a closed state for one of the switches when the other switch is in an open state in each measurement period.

4. The electronic circuit according to claim 1, wherein the structure of the first excitation unit is equivalent to the structure of the second excitation unit, and each excitation unit is connected to a high voltage terminal and a low voltage terminal of a continuous voltage source.

5. The electronic circuit according to claim 4, wherein the first excitation unit includes four switches, and the first switch is connected between the output of the first integrator unit and the fixed electrode of the first capacitor, the second switch is connected between the output of the first integrator unit and the fixed electrode of the second capacitor, the third switch is connected between the high voltage terminal and the fixed electrode of the first capacitor, and the fourth switch is connected between the low voltage terminal and the fixed electrode of the second capacitor, and in a first operating mode of the electronic circuit, the first and second switches are in a closed state when the third and fourth switches are in an open state and vice versa in each measurement period, and wherein the second excitation unit includes four switches, wherein the first switch is connected between the output of the second integrator unit and the fixed electrode of the first capacitor, the second switch is connected between the output of the second integrator unit and the fixed electrode of the second capacitor, the third switch is connected between the low voltage terminal and the fixed electrode of the first capacitor, and the fourth switch is connected between the high voltage terminal and the fixed electrode of the second capacitor, and in the first operating mode of the electronic circuit, the first and second switches are in a closed state when the third and fourth switches are in an open state and vice versa each measurement period.

6. A method for activating the electronic circuit according to claim 1, wherein in an operating mode of the electronic circuit for measuring a physical parameter, the method includes four phases for each successive measurement cycle, consisting of the following phases:
   in a first phase of switching on the second integrator unit with the second excitation unit and switching off the first integrator unit with the first excitation unit, in order to polarize each fixed electrode of the capacitors at an output voltage of the second integrator unit;

in a second phase in which the second integrator unit and the second excitation unit are operating, of polarizing the fixed electrode of the first capacitor at a low voltage of a supply voltage source of the electronic circuit, and the fixed electrode of the second capacitor at a high voltage of the voltage source;

in a third phase of switching on the first integrator unit with the first excitation unit and switching off the second integrator unit with the second excitation unit, in order to polarize each fixed electrode of the capacitors at an output voltage of the first integrator unit; and in a fourth phase where the first integrator unit and the first excitation unit are operative, of polarizing the fixed electrode of the first capacitor at a high voltage, and the fixed electrode of the second capacitor at a low voltage.

7. The method according to claim 6, wherein several successive measurement cycles are carried out so that each integrator unit provides a final output voltage, where one of the final output voltages is above an intermediate rest voltage of the sensor, whereas the other final output voltage is below said intermediate voltage, and a voltage deviation between each final output voltage and said intermediate voltage is representative of the measured physical parameter.

8. The method according to claim 6, wherein in an operating checking mode of the electronic circuit before or during the measurement of the physical parameter, an electrostatic force is deliberately emulated by not polarizing one or other of the fixed electrodes of the capacitors at the high voltage, or the low voltage, during the second or fourth phase of a normal measurement cycle.

9. The method according to claim 8, wherein the fixed electrode of the second capacitor is not polarized at the low voltage during the fourth phase every two measurement cycles.

10. The electronic circuit according to claim 1, wherein the physical parameter measured by the capacitive sensor is selected from the group consisting of an acceleration, an angular velocity, a force and a pressure.

* * * * *